United States Patent [19]

Horie et al.

[11] 3,865,871

[45] Feb. 11, 1975

[54] PROCESS FOR PRODUCING AROMATIC TETRACARBOXYLIC ACIDS AND ANHYDRIDES THEREOF

[75] Inventors: Toshio Horie; Kazuaki Yoshida; Hisako Hori; Yoshihisa Katsuyama, all of Yokohama, Japan

[73] Assignee: The Furukawa Electric Co., Ltd., Tokyo, Japan

[22] Filed: Mar. 5, 1971

[21] Appl. No.: 121,529

[30]     Foreign Application Priority Data
  Mar. 13, 1970   Japan.............................. 45-21317
  Mar. 14, 1970   Japan.............................. 45-21630
  Apr. 4, 1970    Japan.............................. 45-28931
  Oct. 26, 1970   Japan.............................. 45-94086
  Nov. 5, 0170    Japan.............................. 45-97377
  Dec. 10, 1970   Japan............................. 45-109752

[52] U.S. Cl........ 260/524 R, 260/346.4, 260/523 A
[51] Int. Cl............................................. C07c 63/02
[58] Field of Search..................... 260/524 R, 346.4

[56]         References Cited
        UNITED STATES PATENTS

| | | | |
|---|---|---|---|
| 2,833,816 | 5/1958 | Saffer et al. ......................... | 260/524 |
| 3,089,907 | 5/1963 | Saffer et al. ......................... | 260/524 |
| 3,636,095 | 1/1972 | Nakaoka et al..................... | 260/524 |

*Primary Examiner*—Lorraine A. Weinberger
*Assistant Examiner*—Paul J. Killos
*Attorney, Agent, or Firm*—Wenderoth, Lind & Ponack

[57]            ABSTRACT

Process for producing high-purity aromatic tetracarboxylic acids or the anhydrides thereof comprising oxidizing raw material of tetraalkylbenzenes or the derivatives thereof in which a part of the alkyl groups is oxidized or halogenated, by molecular oxygen or a gas containing molecular oxygen in a medium of monocarboxylic acid having 2 to 8 carbon atoms per molecule in the presence of a catalyst containing 8 to 40 parts by weight of bromine and 0.5 to 25 parts by weight of one or more heavy metals per 100 parts by weight of the raw material, and purifying the product.

24 Claims, No Drawings

PROCESS FOR PRODUCING AROMATIC TETRACARBOXYLIC ACIDS AND ANHYDRIDES THEREOF

The present invention provides a process for producing high-purity aromatic tetracarboxylic acids or anhydrides thereof at a high yield.

In accordance with recent developments in the electronic industry, rapid transit means and the space sciences, thermally resistant resins have attained increasing importance as indispensable materials. In these circumstances, aromatic tetracarboxylic acids of which pyromellitic acid is a representative one are being used for various purposes as raw material for thermally resistant resins, and their production is gradually increased.

Generally aromatic carboxylic acids are prepared by oxidizing alkylbenzenes.

Alkylbenzenes could be oxidized by the following methods:
nitric acid oxidation which uses nitric acid as oxidant, vapour phase air oxidation in which alkylbenzenes in vapour are oxidized by air, and liquid phase air oxidation in which alkylbenzenes in liquid phase are oxidized by molecular oxygen in the presence of an oxidation catalyst containing a heavy metal and bromine.

Of the oxidizing methods mentioned above, the nitric acid oxidation can hardly produce high-purity products because it is liable to cause formation of nitrogen compounds as impurities and can not give a high yield. In addition, this method has many other faults as (1) a large consumption of nitric acid and (2) severe corrosion of apparatus by nitric acid and great danger in operation due to the high temperature and pressure used.

Similarly vapour phase air oxidation hardly produces high-purity products and does not give a high yield. The additional drawbacks of this method are (1) a high reaction temperature, (2) a complicated procedure to remove the heat evolved by the reaction and (3) a large amount of air required for the reaction, which in turn calls for a large scale apparatus.

In contrast to the above methods, the liquid phase air oxidation method has various advantages, that is (1) a high yield, (2) simple process, (3) low cost of auxiliary materials and (4) a wide choice of applicable raw materials, though a higher equipment cost is required because a corrosive solvent is used.

Recently, processes for preparing aromatic polycarboxylic acids having three or less carboxyl groups have made progress. The liquid phase air oxidation method has particularly been developed in which oxidation is carried out in the presence of a catalyst containing heavy metal and bromine, and by this method terephthalic acid, trimellitic acid and others have been produced in a large scale.

A number of patents, as well as various improvements, have been proposed in connection with this method. But, no one has succeeded in synthesizing aromatic polycarboxylic acids having four or more carboxyl groups by this method. For example, Alfred Saffer et al. attempted to oxidize durene and obtained methyltricarboxybenzene with a yield of 50 percent (U.S. Pat. No. 2,833,816), or a small amount of a mixture of di-, tri- and tetra-carboxylic acids (U.S. Pat. No. 3,089,907). No report has been found concerning the synthesis of aromatic tetracarboxylic acids in other similar patents. Under these circumstances, the nitric acid oxidation method or the vapour phase air oxidation method, which are inferior to the liquid phase air oxidation method in many points, have been so far applied to the production of aromatic tetracarboxylic acids such as pyromellitic acid. In these methods, however, the yield is low and high-purity products can hardly be obtained so that there is the necessity of purification process with the resultant increase in cost of the products.

The present inventors repeated many times the attempt to obtain aromatic tetracarboxylic acids by oxidizing tetraalkylbenzenes or the derivatives thereof under the desirable conditions of catalyst, which is considered most adequate in the patents employing the liquid phase air oxidation, that is, the amount of the heavy metal and bromine calculated as $MnBr_2$ being 0.1 to 10 percent by weight of the aromatic reactant charged (where the heavy metal and bromine contents are 0.0256 to 2.56 percent by weight and 0.0744 to 7.44 percent by weight, respectively) and the ratio of Mn to Br being 1 to 10 Mn atoms per Br atom and 10 to 1 Br atoms per Mn atom, but all the attempts proved unsuccessful.

The present inventors investigated the effect of the composition of the catalyst and the amount to be applied and the purification method of the oxidation product, and found that aromatic tetracarboxylic acids could be synthesized with a satisfactory yield only in the presence of such a large amount of catalyst as is far beyond the amount to be applied in the synthesis of aromatic polycarboxylic acids having three or less carboxyl groups.

More particularly, the present invention provides a complete series of industrial operations for oxidizing tetraalkylbenzenes or the derivatives thereof in which a part of the alkyl groups is oxidized or halogenated in a medium of a carboxylic acid containing 2 to 8 carbon atoms with molecular oxygen or with a gas containing molecular oxygen in the presence of a catalyst consisting of heavy metal and bromine, comprising use of the bromine compound as a component of the catalyst in the amount of 8 to 40 parts, preferably 10 to 15 parts by weight calculated as Br per 100 parts by weight of the raw material to be oxidized and a salt of a heavy metal such as Co, Mn and Ce, as another component, in the amount of 0.5 to 25 parts, preferably 3 to 10 parts, by weight calculated as metal per 100 parts by weight of the raw material to be oxidized, purifying the oxidation product to obtain highly pure aromatic tetracarboxylic acids at a high yield, and on the other hand recovering the heavy metal component used as catalyst and the bromine component which exists in the filtrate.

In the oxidation process of this invention the necessity of using such a large amount of catalyst as is not only unimaginable in the synthesis of aromatic polycarboxylic acids having three or less carboxyl groups but also generally considered to have a negative effect, is presumably due to the following phenomena which are remarkable in the synthesis of aromatic tetra carboxylic acids.

1. Generally, carboxyl groups adjacent to each other on a benzene ring form a strong bond with the heavy metal component in the catalyst and depress the catalystic activity. This is very liable to occur in aromatic tetracarboxylic acids, but the phenomenon could be lessened by adding a large amount of bromine.

2. In a reaction to form tetracarboxylic acids, the last, or the fourth, alkyl group is hardly oxidized into a carboxyl group. The difficulty is far beyond that encountered in the oxidation of aromatic poly-carboxylic acid having three or less carboxyl groups. Thus, a large amount of strong hydrogen radical abstracter such as a bromine radical is needed. In other words, a large amount of bromine component is required as catalyst and the active bromine radicals are formed as expressed by the following reaction:

$$HBr + M^{3+} \rightarrow Br + M^{2+} + H^+$$

(M: heavy metal)

In accordance with the reaction formula, a large amount of metal component is required, as much as the bromine component.

3. Tetraalkylbenzenes as the raw material to be oxidized are liable to form quinone due to oxidation by molecular oxygen, so that a large amount of bromine should be added to prevent the formation of quinone.

4. When the raw materials to be oxidized, tetraalkylbenzenes or the derivatives thereof, are treated by the liquid phase air oxidation, the oxidation reaction proceeds rapidly in the earlier stage, but becomes suddenly slower as tetracarboxybenzene is formed in the reaction system. This is supposedly due to the heavy metal component of the catalyst forming salt with tetracarboxylic acid and to the extremely weak catalytic activity of the salt.

This is confirmed by the fact that the solid matter formed by the reaction contains a salt of aromatic tetracarboxylic acid and the heavy metal which accounts for as much as 95 percent of the heavy metal component first existing in the catalyst.

5. Since the reaction time required is relatively long to form tetracarboxylic acids, side reactions are apt to occur; for example, if the amount of the catalyst is small, radical coupling and acid decomposition of hydroperoxide, a reaction intermediate. As a result, therefore a large amount of by-products may be formed.

6. Due to a large quantity of water formed, the heavy metal component in the catalyst is liable to be deactivated.

Considering various factors mentioned above which are peculiar to oxidation of tetraalkylbenzenes, the use of a large amount of heavy metal and bromine components as catalyst is necessary.

The raw materials to be oxidized in this invention are tetraalkylbenzenes and their derivatives. Tetraalkylbenzenes are, for example, tetramethyl benzenes such as durene, isodurene and prehnitene, trimethylisopropylbenzenes and dimethyldiisopropylbenzenes, or may have bifunctional groups attached to two different aromatic carbon atoms, such as 2,3-dimethyltetrahydronaphthalene and octahydroanthracene. However, tetramethylbenzenes are generally best.

Further, alkyl groups as side chains may contain chlorine or oxygen atoms such as, for example, bis(chloromethyl)xylenes, chloromethylpseudocumenes, chloromethyl mesitylenes, bis(hydroxymethyl(xylenes, and hydroxymethylpseudocumenes. Furthermore, the alkyl groups as side chains may be partly oxidized into aldehyde, ketone or acid such as for example, monoformyltrimethylbenzenes, dimethylisophthalic acids and trimethyl benzoic acids.

Solvents to be used in this reaction include organic acids having 2 to 8 carbon atoms such as acetic, propionic, butyric and benzoic acids. Among them, the most desirable to acetic acid which is stable against oxidation and the most suitable amount to be used is 1 to 30 parts, preferably 3 to 10 parts by weight per part by weight of raw material to be oxidized.

The effective heavy metal components in the catalyst may be Co, Mn, Ce, Ni, Cr, V, Mo, W or a mixture thereof. They are applied in the form of carboxylate such as acetate and naphthenate, or as carbonate, bromide, chloride, hydroxide and oxide. Among them, Co, Mn and Ce or a mixture thereof as the heavy metal component have especially excellent catalytic activity. When a mixture of Co, Mn and Ce is used as catalyst, the amount of Ce is preferably 25 to 60 percent by weight of the total amount. As for a catalyst consisting of Mn and Co, a mixture of their compounds, acetate or carbonate, in the weight ratio of 4:1 to 2:1 is very effective in producing aromatic tetracarboxylic acids at a high yield.

The bromine component of the catalyst may be provided in the form of the bromide of the active heavy metals mentioned above, inorganic compounds such as HBr, $CaBr_2$, KBr, NaBr, $NH_4Br$ and $Br_2$, or organic compounds such as tetrabromoethane, or a mixture thereof. Application of bromine in the form of a metal bromide such as potassium bromide or manganese bromide is especially effective in obtaining good results.

The composition of the catalyst should be such that the atomic ratio of bromine to heavy metal is preferably between 1:1 to 10:1 and the most suitable amount and composition are given by the following formula, $$(8/X) + 8 < Y < (8/X\text{-}18) + 24$$

where $X$ and $Y$ are parts by weight of the heavy metal and bromine, respectively, per 100 parts by weight of the raw material to be oxidized.

In the process of this invention, the temperature at which the oxidation reaction proceeds is required to be elevated ultimately to 180° to 240°C to complete the reaction. As, however the reaction proceeds relatively fast in the early stage, it is desirable to maintain the temperature relatively low, that is at 95° to 180°C, preferably 110°C to 160°C at the early stage until the raw material to be oxidized absorbs molecular oxygen to such an extent that it turns into at least aromatic monocarboxylic acids and then elevate the temperature to 180° to 240°C for further oxidation. This treatment leads to an improved yield, as much as 90 to 95 molar percent, and quality of the products. If the temperature at the early stage of oxidation is too high, side reactions such as coupling reaction and decarboxylation reaction may occur.

The above mentioned side reactions can also be suppressed by divided application of catalyst. Since the reaction does not require much catalyst at the early stage because hydrogen radical abstraction readily occurs, a part of the catalyst, or preferably 10 to 60 percent by weight of the total amount of catalyst, may be used at the early stage until the raw material to be oxidized absorbs molecular oxygen to such an extent that it turns into at least aromatic monocarboxylic acids. The remaining quantity of the catalyst is then added for further oxidation. By this process in which the oxidation reaction is carried out in two stages, the yield of the products is much improved. Further, the product itself is the least-coloured high-quality one. The pressure required during the reaction is such as is enough to maintain the materials in liquid phase and may be within the range of 1 to 100 atmospheres, preferably 10 to 50 atmospheres.

Molecular oxygen to be used as oxidant is pure oxygen or oxygen diluted by an inert gas, such as air. Oxygen supplied at the early stage of the oxidation reaction is almost thoroughly absorbed and the supply rate of oxygen is closely related to the purity of final products. However, excessive reduction of the oxygen supply rate for the purpose of suppressing the oxidation reaction at the early stage is not desirable. To obtain products of good quality, the following relation between the reaction temperature and the minimum oxygen supply rate preferably applies at the early stage until the raw material to be oxidized absorbs molecular oxygen to such an extent that it turns into at least aromatic monocarboxylic acids.

$$V = - (3/T-80) + 0.280$$

where
$V$: supply rate of oxygen in mol/min per mol of raw materials to be oxidized,
$T$: temperature in °C.

If oxygen is supplied for the reaction at a rate beyond that regulated by the above equation, the final products are far less coloured than when oxygen is supplied at a rate below that fixed by the equation. For safety, oxygen may be supplied at a rate less than 0.60 mol/min per mol of the raw materials to be oxidized.

In this invention the oxidation product obtained by the above described oxidation reaction is purified to obtain pure aromatic tetracarboxylic acids, but the solid oxidation product can not be turned into pure aromatic tetracarboxylic acids merely by recrystallization or by washing with water or acetic acid, which is the solvent for the reaction. The present inventors investigated the method for purifying the oxidation product after the oxidation reaction, and found that the oxidation product contains salts of aromatic tetracarboxylic acids and heavy metal in the catalyst and that the salt can be removed by treating the product with an aqueous solution of a strong acid, preferably hydrochloric, nitric or sulfuric acid. Especially the salts can be removed effectively if the product is boiled and then cooled in the said aqueous solution thereby precipitating aromatic tetracarboxylic acids free from the salts in the form of crystal. The concentration of the strong acid is preferably 3 to 50 percent by weight in the aqueous solution and 0.1 to 1.0 part by molar weight calculated as acid is used for 100 parts by weight of the oxidation product. The crystals obtained here are fairly pure, but can be made purer by recrystallization. Since the strong acid solution from which crystals have been separated contains the heavy metal used as catalyst in the form of salt of the strong acid, the metal can be recovered as carbonate precipitate by making the pH of the solution 6 to 8 with alkali or alkaline earth carbonate. The heavy metal carbonate recovered in this way can be repeatedly used as a catalyst component for the oxidation reaction. Thus, in this purifying method aromatic tetracarboxylic acids can be separated easily and the heavy metal component of the catalyst can be recovered effectively.

In filtrating the oxidation product prior to the above described purification process, one may add some water to the reaction mixture to dissolve the aromatic tetracarboxylic acids formed by the reaction selectively in the solvent. More particularly, water is added to the reaction mixture after the oxidation in the amount of 0.5 to 2 parts by weight per part by weight of the raw material to be oxidized, and the heavy metal salts of the aromatic tetracarboxylic acids are separated from the hot reaction mixture. The hot filtration is preferably conducted at a temperature 110° to 180°C. Aromatic tetracarboxylic acids can be obtained by cooling the filtrate. The salts thus obtained are treated as described above to recover the heavy metal in the form of carbonate and aromatic tetracarboxylic acids. Further, to take out aromatic tetracarboxylic acids contained in the oxidation, product after the oxidation reaction, it may be heated to a high temperature so that the aromatic tetracarboxylic acids alone can be separated by sublimation or by distillation. In this treatment two carboxyl groups adjacent to each other on a benzene ring are dehydrated to form acid anhydride, and the residue contains the heavy metal in the catalyst.

Above mentioned processes of purification of the oxidation product and recovery of the heavy metal component are a result of ingenious utilization of the inherent property of heavy metal to form salt with aromatic tetracarboxylic acids and precipitate as such.

The filtrate after removal of the oxidation product from the reaction mixture cooled after the oxidation reaction can be distilled to recover the solvent used for the reaction, and the residue of the distillation contains an especially large amount of bromine compound. But the residue itself can not be used as bromine component of the catalyst, because it contains oxidation retarder that forms during the oxidation. However, when washed with alcohols, ketones or ethers, it regains the catalytic activity and becomes usable again. For this purpose, alcohols include methanol, ethanol, propanol and cyclohexanol; ketones include acetone, methylethylketone and cyclohexanone; and ethers include diethylether, tetrahydrofuran and dioxane. The amount of the solvents to be used for washing is 0.1 to 10 parts, preferably 0.5 to 5.0 parts by weight per part by weight of the residue of distillation. In this way, approximately 80 to 90 percent of the total bromine, initially applied as catalyst for the oxidation reaction, could be recovered.

As has been stated above, the present invention is characterized by production of highly pure aromatic tetracarboxylic acids at a high yield, which has not hitherto been possible by the conventional liquid phase air oxidation method, and provides a series of complete processes for preparing aromatic tetracarboxylic acids, which with effective recovery of the catalyst employed in the oxidation reaction involved, have great industrial value.

EXAMPLE 1

Into an autoclave made of an acid corrosion resistant metal which is equipped with heating and cooling means, a gas inlet tube, a condenser and an agitator were placed the following substances:

20 g of durene, 1 g of cobalt acetate tetrahydrate (Co(AcO)$_2$.4H$_2$O), 3 g of manganese acetate tetrahydrate (Mn(AcO)$_2$.4H$_2$O), 4 g of potassium bromide (KBr) and 100 g of glacial acetic acid; (In this composition, the contents per 100 g of durene are 1.2 g of cobalt, 3.4g of manganese and 13.4 g of bromine).

In the next place, after the atmosphere in the autoclave was replaced by nitrogen, the above mixture was heated to 210°C while being vigorously stirred. While the temperature was kept at this level and the pressure maintained at 20 Kg/cm$^2$ with air, air was blown for 4 hours through the gas inlet tube into the reacting mixture at the flow rate of 5 litres (N.T.P.)/min. measured with a flow meter to promote the reaction. Subsequently, the autoclave was cooled and the pressure was lowered to the normal level and the content including solid crystalline deposit was taken out of the autoclave. The solid deposit was separated by filtration and dried at 110°C in a drier to obtain 31.7 g of a pale blue oxidation product. It contained as major constituents pyromellitic acid and heavy metal salts thereof and an analysis showed it contained 30.6 g of pyromellitic acid (existing as acid and salts), 0.22 g of cobalt and 0.66 g of manganese, while 99 g of the filtrate obtained contained 3.2 g of pyromellitic acid by analysis. Therefore, the total amount of pyromellitic acid formed by the reaction was 33.8 g and the rate of its formation (conversion selectivity) was 89.3 molar % (169 percent by weight) based on durene.

The pale blue oxidation product thus obtained was dissolved in 100 ml of a 10 percent nitric acid solution under heat, and the solution was cooled to the room temperature upon which crystals were deposited. They were separated by filtration, washed with water and dried at 110°C and 26.9 g of white crystals were obtained. The acid value of this product was 879 (the theoretical acid value of pyromellitic acid is 883), and the analysis by IR absorption spectroscopy confirmed that the substance was pyromellitic acid. The yield of pyromellitic acid was 71 molar % (or 135 percent by weight) based on durene.

The Harzen's number of a solution prepared by dissolving 5 g of pyromellitic acid obtained in 50 ml of 25 percent solution of sodium hydroxide was 50.

The filtrate obtained by removing the oxidation product from the reaction mixture, was distilled to remove acetic acid used as reaction solvent and water formed by the reaction, and 10.1 g of the solid residue of distillation was mixed with 20.2 g of methyl alcohol, stirred thoroughly and the solid matter separated from the liquid was dried at 120°C. The solid matter thus recovered was 6.4 g, and an analysis showed that it contained 9.4 % by weight of pyromellitic acid and 38 percent by weight of bromine, so that 90.6 percent of the bromine used for the oxidation reaction was recovered.

The nitric acid solution containing heavy metal from which pyromellitic acid had been separated was mixed with the washing liquid with which pyromellitic acid had been washed. To 145 ml of the solution was added 19 g of sodium hydrogen carbonate, stirred for 15 minutes at pH 7.02 and the deposited solid matter was filtered, washed with 100 ml of water and dried to obtain 2.2 g of light pink solid matter. By analysis it contained 9.14 percent of cobalt and 29.2 percent of manganese. Therefore, the recovered quantity of the heavy metal component used for the oxidation reaction was 83.7 percent for cobalt and 94.4 percent for manganese.

For comparison, a composition considered the most suitable in the aforementioned patents (U.S. Pat. No. 2,833,816) was tested in the same manner. In the same autoclave as used in Example 1 were placed 20 g of durene, 0.1 g of cobalt acetate tetrahydrate, 0.25 g of manganese acetate tetrahydrate, 0.3 g of potassium bromide and 100 g of glacial acetic acid (in this composition, the contents per 100 g of durene are 0.12 g of cobalt, 0.28 g of manganese and 1.0 g of bromine), and they were made to react under the same conditions as in Example 1. After being cooled, the reaction mixture was taken out of the autoclave and then the deposited solid matter was separated by filtration and dried at 110°C to obtain 1.4 g of light yellow solid. This was put in 20 ml of 10 percent nitric acid and heated and then, after cooling the solid was filtered. The solid was washed with water, dried at 110°C to obtain 1.1 g of brown solid, of which the acid value was 627. The infrared spectroscopic analysis also revealed it was not pyromellitic acid.

EXAMPLES 2 to 9

The same process as in Example 1 was followed except for the use of 20 g of various raw materials in place of durene, and 150 g of glacial acetic acid as solvent. The results obtained are shown in Table 1.

Table 1

|  | Example 2 | Example 3 | Example 4 | Example 5 |
|---|---|---|---|---|
| Raw material to be oxidized | 4,6-dimethyliso-phthalic acid | Prehnitene | Isodurene | 5-Isopropyl-pseudocumene |
| Product | Pyromellitic acid | Prehnitic acid | Mellophanic acid | Pyromellitic acid |
| Results |  |  |  |  |
| Rate of formation (molar %) | 95.5 | 80.3 | 79.4 | 56.3 |
| Yield (g) | 20.1 | 14.6 | 18.3 | 11.0 |
| (molar %) | 77 | 39 | 48 | 35 |
| (weight %) | 101 | 73 | 92 | 55 |
| Acid value | 881 | 871 | 878 | 871 |
| Colouration (Harzen's number) | 60 | 70 | 70 | 90 |

Table 1 — Continued

|  | Example 6 | Example 7 | Example 8 | Example 9 |
|---|---|---|---|---|
| Raw material to be oxidized | 4,6-bis(chloro-methyl)-m-xylene | 4,6-bis(hydro-xymethyl)-m-xylene | 5-chloro-methyl-pseudocumene | 5-methylol-pseudocumene |
| Product | Pyromellitic acid | Pyromellitic acid | Pyromellitic acid | Pyromellitic acid |
| Results | | | | |
| Rate of formation (molar %) | 83.1 | 82.0 | 82.6 | 80.0 |
| Yield | | | | |
| (g) | 16.0 | 19.9 | 19.0 | 22.0 |
| (molar %) | 64 | 65 | 63 | 65 |
| (weight %) | 80 | 100 | 95 | 110 |
| Acid value | 878 | 875 | 871 | 874 |
| Colouration (Harzen's number) | 60 | 50 | 60 | 70 |

EXAMPLES 10 to 15

The same process for reaction as in Example 1 was followed except that the heavy metal compound to give the heavy metal as a component of the catalyst, the atomic ratio of bromine to heavy metal components in the catalyst and the amount of solvent for reaction were different from those in Example 1. The results obtained are shown in Table 2. In Example 14, the air supply rate was 10 liters (N.T.P.)/minute.

EXAMPLES 16 to 20

20 g of durene was oxidized under the same conditions as in Example 1 except for the use of different kinds of bromine compounds, which give bromine as a component of the catalyst. The results obtained are shown in Table 3.

Table 2

|  | Example 10 | Example 11 | Example 12 | Example 13 | Example 14 | Example 15 |
|---|---|---|---|---|---|---|
| Amount of durene (g) | 20 | 20 | 20 | 20 | 40 | 20 |
| Catalyst | | | | | | |
| Cobalt acetate tetrahydrate(g) | 1.5 | 0.6 | 6.0 | — | 2.0 | — |
| Manganese acetate tetrahydrate (g) | 5.0 | 1.8 | — | 6.0 | 2.0 | — |
| Cerium acetate monohydrate (g) (Ce(AcO)$_3$.H$_2$O) | — | — | — | 2.0 | — | — |
| Metal catalyst recovered in Example 1 (g) | — | — | — | — | 2.2 | — |
| Potassium bromide(g) | 2.5 | 10.5 | 4.0 | 4.0 | 8.0 | 4.0 |
| Glacial acetic acid(g) | 100 | 100 | 150 | 150 | 200 | 100 |
| Amount of catalyst per 100 g of durene | | | | | | |
| cobalt (g) | 1.8 | 0.7 | 7.1 | — | 1.2 | 1.0 |
| Manganese (g) | 5.6 | 2.0 | — | 6.7 | 1.1 | 3.2 |
| Cerium (g) | — | — | — | — | 2.1 | — |
| Bromine (g) | 8.4 | 35.3 | 13.4 | 13.4 | 13.4 | 13.4 |
| Bromine/metal (atomic ratio) | 0.80 | 9.1 | 1.4 | 1.4 | 3.0 | 2.2 |
| Results | | | | | | |
| Yield (g) | 16.3 | 18.1 | 15.2 | 13.3 | 58.1 | 26.0 |
| (molar %) | 43 | 48 | 40 | 35 | 77 | 69 |
| (weight %) | 82 | 91 | 76 | 67 | 145 | 130 |
| Product | | | Pyromellitic Acid | | | |
| Acid value | 870 | 871 | 873 | 875 | 881 | 878 |
| Colouration (Harzen's number) | 60 | 50 | 60 | 60 | 50 | 60 |

Table 3

|  | Example 16 | Example 17 | Example 18 | Example 19 | Example 20 |
|---|---|---|---|---|---|
| Catalyst | | | | | |
| Cobalt acetate tetrahydrate (g) | 1.5 | 1.5 | 1.5 | 1.5 | 1 |
| Manganese acetate tetrahydrate (g) | 4.5 | 4.5 | — | 4.5 | 3 |
| Manganese bromide tetrahydrate (g) | — | — | 5.3 | — | — |
| Ammonium bromide (g) | — | 3.7 | — | — | — |
| Sodium bromide (g) | — | — | — | 3.7 | — |
| Tetrabromoethane (g) | 3.2 | — | — | — | — |
| Bromine compound recovered in Example 1 | — | — | — | — | 6.4 |

Table 3—Continued

|  | Example 16 | Example 17 | Example 18 | Example 19 | Example 20 |
|---|---|---|---|---|---|
| Amount of catalyst | | | | | |
| per 100 g of durene | | | | | |
| Cobalt (g) | 1.8 | 1.8 | 1.8 | 1.8 | 1.2 |
| Manganese (g) | 5.0 | 5.0 | 5.1 | 5.0 | 3.4 |
| Bromine (g) | 14.8 | 15.1 | 14.8 | 14.4 | 12.2 |
| Bromine/metal (atomic ratio) | 1.4 | 1.6 | 1.5 | 1.5 | 1.8 |
| Results | | | | | |
| Yield (g) | 17.4 | 15.5 | 24.8 | 24.3 | 27.4 |
| (molar %) | 46 | 41 | 66 | 64 | 72 |
| (weight %) | 87 | 78 | 124 | 122 | 137 |
| Product | | | Pyromellitic acid | | |
| Acid value | 879 | 878 | 881 | 878 | 879 |
| Colouration (Harzen's number) | 70 | 60 | 50 | 60 | 50 |

EXAMPLE 21

This example shows the oxidation performed in two steps.

The same autoclave as in Example 1 equipped with a device to measure the oxygen content of the exhaust gas was used. In the autoclave was placed a mixture of

| 20 g | Durene |
| 1 g | Cobalt acetate tetrahydrate |
| 3 g | Manganese acetate tetrahydrate, |
| 4 g | Potassium bromide and |
| 100 g | Glacial acetic acid. |

The mixture was heated to 150°C under nitrogen pressure, and then, while being vigorously stirred, made to react while air was blown into the reacting mixture at the rate of 5.0 litres (N.T.P.)/min. under the pressure of 20 Kg/cm². The reaction was continued for 30 minutes. The amount of oxygen absorbed during this period was calculated from the oxygen content of the exhaust gas, and this was 17.9 g, that is 3.7 moles per mole of durene. This means that durene was oxidized to form 2 to 3 carboxyl groups per molecule. The temperature was raised to 210°C, while the same pressure and the same air blowing rate were kept. After the reaction for about 3 hours and 30 minutes more (4 hours total), the air blowing was stopped and the mixture was cooled.

After being cooled, the oxidation mixture was taken out of the autoclave and the oxidation product was separated by filtration, washed with water and dried to obtain 35.3 g of a solid. This solid material consisted of pyromellitic acid and heavy metal salts thereof as major components, and by analysis it contained 32.8 g of pyromellitic acid (existing as acid and salts), 0.21 g of cobalt and 0.66 g of manganese. On the other hand, 102 g of filtrate was obtained which by analysis contained 2.8 g of pyromellitic acid. In conclusion, 35.6 g of pyromellitic acid was formed in total and, therefore, the rate of formation was 94.0 molar % (or 178 percent by weight) based on durene.

The solid material was dissolved by heating in 150 ml of 10 percent aqueous solution of nitric acid. When the solution was cooled, crystals deposited. The crystals were separated by filtration, washed with water, and dried at 110°C to obtained 30.6 g of white crystals. The acid value was 882 and the infrared spectroscopic analysis showed that it was pyromellitic acid. The yield of pyromellitic acid was 81 molar % (or 153 percent by weight) based on durene.

EXAMPLES 22 to 26

Pyromellitic acid was synthesized under the conditions specified in Table 4. The purification was conducted after the oxidation reaction in the same manner as in Example 1. The results are shown in Table 4. In all these examples except Example 25, oxidations were performed in two steps and they primarily showed the effect of different reaction temperatures in the early step. Example 25 shows the effect of divided application of the catalyst (potassium bromide and glacial acetic acid in the quantities indicated by an asterish were added after the first reaction was completed) and Example 26 shows the effect of decrease in air supply rate on colouration.

Table 4

|  | Example 22 | Example 23 | Example 24 | Example 25 | Example 26 |
|---|---|---|---|---|---|
| Durene (g) | 20 | 20 | 240 | 20 | 20 |
| Acetic acid (g) | 100 | 100 | 1200 | 100+(20*) | 100 |
| Catalyst | | | | | |
| Cobalt acetate tetrahydrate (g) | 0.8 | 1.0 | 3.0 | 1 | 0.8 |
| Manganese acetate tetrahydrate (g) | 2.8 | 3.0 | 20.0 | 3 | 2.8 |
| Manganese carbonate (g) | — | — | 16.0 | — | — |
| Basic cobalt carbonate (g) (2CoCO₃.Co(OH)₂.H₂O) | — | — | 6.5 | — | — |
| Potassium bromide | 3.5 | — | 50 | 1+(2.5*) | 3.5 |
| Ammonium bromide (g) | 3.5 | | | | |

Table 4 — Continued

| | Example 22 | Example 23 | Example 24 | Example 25 | Example 26 |
|---|---|---|---|---|---|
| Amount of catalyst per 100 g of durene | | | | | |
| Cobalt (g) | 1.0 | 1.2 | 1.8 | 1.2 | 1.0 |
| Manganese (g) | 3.1 | 3.4 | 5.1 | 3.4 | 3.1 |
| Bromime (g) | 11.8 | 14.3 | 14.0 | 12.0 | 11.8 |
| Bromine/metal (atomic ratio) | 2.03 | 2.1 | 1.4 | 1.8 | 2.0 |
| Condition of the first step reaction | | | | | |
| Temperature (°C) | 110 | 150 | 140 | 210 | 150 |
| Pressure (Kg/cm² gauge) | 20 | 20 | 30 | 20 | 20 |
| Time (min.) | 20 | 20 | 20 | 30 | 30 |
| Air flow rate (litre(N.T.P.)/min.) | 4.5 | 4.2 | 60 | 5.0 | 3.3 |
| Number of carboxyl groups calculated from absorbed oxygen | 1–2 | 2–3 | 2–3 | 2–3 | 2–3 |
| Condition of the second step reaction | | | | | |
| Temperature (°C) | 210 | 230 | 205 | 210 | 210 |
| Pressure(Kg/cm²) | 20 | 20 | 30 | 20 | 20 |
| Time(min) | 210 | 210 | 220 | 210 | 210 |
| Air flow rate (litre(N.T.P./min.) | 2.5 | 2.5 | 30 | 2.5 | 2.5 |
| Results | | | | | |
| Yield(g) | 25.1 | 21.9 | 33.6 | 28.0 | 26.5 |
| (molar %) | 66 | 58 | 74 | 74 | 70 |
| (% by weight) | 126 | 110 | 140 | 140 | 133 |
| Product | | | Pyromellitic acid | | |
| Acid value | 880 | 882 | 881 | 883 | 876 |
| Colouration (Harzen's number) | 60 | 60 | 50 | 50 | 350 |

EXAMPLE 27

A mixture consisting of

| 40 g | Durene, |
| 1.5 g | Cobalt acetate tetrahydrate, |
| 4.5 g | Manganese acetate tetrahydrate, |
| 10 g | Potassium bromide and |
| 200 g | Glacial acetic acid |

(in this composition, the contents per 100 g of durene are 0.9 g of cobalt, 2.5 g of manganese and 16.8 g of bromine) was placed in the autoclave and air was blown at the rate of 10 litres (N.T.P.)/min to perform the reaction as in Example 21. When the reaction was completed, 50 g of water was pressed into the autoclave at 210°C while the pressure inside was maintained, the resulting mixture was stirred and cooled to 160°C, the reaction mixture was and then with the temperature kept at 160°C treated in a pressure filter. The filtrate was cooled. Solid material formed in it was separated, washed with water, and then dried to obtain 60.2 g of white crystals. The acid value of the crystals was 880. The cobalt and manganese contents were less than 0.1 percent by weight and the crystals were confirmed to be nearly pure pyromellitic acid by infrared spectroscopic analysis.

The solid matter obtained by filtration at 160°C under pressure was dried to obtain 9.5 g of a violet solid, which proved to contain 3.3 percent of cobalt and 10.4 percent of manganese, which correspond to 88 percent of cobalt and 98 percent of manganese, originally used in the oxidation reaction.

EXAMPLE 28

A mixture consisting of 240 g of durene, 12 g of cobalt acetate tetrahydrate, 36 g of manganese acetate tetrahydrate, 48 g of potassium bromide and 1,200 g of acetic acid (in this composition, the contents per 100 g of durene are 1.2 g of cobalt, 3.4 g of manganese and 13.4 g of bromine) was placed in the autoclave and treated in the same manner as in Example 21 except that air was blown at a rate of 60 litre(N.T.P.)/min. The reaction mixture was cooled and a solid matter was separated by filtration. This was thoroughly dried in a drier and then 425 g of light yellow powder was obtained. The powder contained 2.5 g of cobalt and 7.9 g of manganese. The oxidation product was placed evenly in a tray (30 cm long, 25 cm wide and 5 cm deep) covered with a flat plate and allowed to react for 10 hours in a 230°C hot air drier. Finally, 372 g of dark gray solid was obtained, which contained 298 g of pyromellitic dianhydride, 57 g of heavy metal salts of pyromellitic acid and 17 g of others.

This solid matter was uniformly crushed, and placed in a fluidized bed reactor equipped with multistage traps at the outlet, into which nitrogen gas was supplied. The nitrogen gas was heated to 235°C with an electric heater. A black residue gradually accumulated in a layer. Introduction of nitrogen was stopped after 2 hours and crystals trapped were taken out to obtain 289 g of white needles. The crystals contained 99.8 percent of pyromellitic dianhydride, 0.18 percent of pyromellitic acid and 0.02 percent of others. The final residue amounted to 79 g which, by analysis, contained 3.2 percent by weight of cobalt and 10.0 percent by weight of manganese.

What is claimed is:

1. A process for producing a high-purity aromatic tetracarboxylic acid or the anhydride thereof, which comprises oxidizing a raw material of a tetraalkylbenzene or a derivative thereof selected from the group consisting of those wherein the alkyl groups contain chlorine or oxygen or are partly oxidized to the aldehyde, ketone or acid, by means of molecular oxygen or a gas containing molecular oxygen in a medium of a monocarboxylic acid having 2 to 8 carbon atoms per molecule and in the presence of a catalyst containing 10 to 15 parts by weight of bromine and 3 to 10 parts by weight of one or more heavy metals selected from the group consisting of Co, Mn, Ce, Ni, Cr, V, Mo and W per 100 parts by weight of the tetraalkylbenzene, and purifying the resultant oxidation product by treating the product with an aqueous solution of a strong acid.

2. Process according to claim 1 wherein one or more substances selected from the group consisting of tetramethylbenzenes, monoisopropyltrimethylbenzenes, monochloromethyltrimethylbenzenes, bis(chloromethyl)dimethylbenzenes, monohydroxymethyltrimethylbenzenes, and bis(hydroxymethyl)-dimethylbenzenes are used as raw material to be oxidized.

3. Process according to claim 1 wherein tetramethylbenzenes are used as raw material to be oxidized.

4. Process according to claim 1 wherein durene is used as raw material to be oxidized.

5. Process according to claim 1 wherein the heavy metal component of the catalyst is one or more substances selected from the group consisting of cobalt, manganese and cerium.

6. Process according to claim 1 wherein the heavy metal component of the catalyst is composed of cobalt, manganese and cerium, the cerium content being 25 to 60 percent by weight of the total quantity of the heavy metal component.

7. Process according to claim 1 wherein the heavy metal component of the catalyst is introduced into the reaction system in the form of one or more substances selected from the group consisting of the bromide, chloride, acetate, carbonate, hydroxide and oxide of the heavy metal.

8. Process according to claim 11 wherein the bromine component of the catalyst is introduced into the reaction system in the form of one or more substances selected from the group consisting of cerium bromide, calcium bromide, manganese bromide, cobalt bromide, potassium bromide, sodium bromide, ammonium bromide, organic bromine compounds, hydrogen bromide and bromine.

9. Process according to claim 1 wherein the oxidation reaction is carried out initially in the presence of 10 to 60 percent by weight of the total quantity of the catalyst until the raw material to be oxidized absorbs molecular oxygen at least to an extent such that it is converted to an aromatic monocarboxylic acid, and is then continued after addition of the remaining quantity of the catalyst.

10. Process according to claim 11 wherein the oxidation reaction is carried out initially at a temperature of 95° to 180°C until the raw material absorbs molecular oxygen at least to an extent such that it is converted to an aromatic monocarboxylic acid, and is then continued at an elevated temperature of 180° to 240°C.

11. Process according to claim 1 wherein the oxidation reaction is carried out by means of molecular oxygen supplied at a rate expressed by the formula $$V = -(3/T\text{-}80) + 0.280$$

where V is the supply rate of oxygen in mol/min per mol of raw material and T is the reaction temperature in degrees centigrade, until the raw material absorbs molecular oxygen at least to an extent such that it is converted to an aromatic monocarboxylic acid.

12. Process according to claim 1 wherein after the oxidation reaction 0.5 to 2 parts by weight of water per part by weight of raw material is introduced into the reaction mixture, which is then filtered at a temperature of 110° to 180°C.

13. Process according to claim 1 wherein durene is oxidized by means of air at a temperature of 180° to 240°C and a pressure of 10 to 50 atmospheres, using acetic acid as the monocarboxylic acid and a catalyst which contains 3 to 10 parts by weight of a mixture of cobalt and manganese and 10 to 15 parts by weight of bromine per 100 parts by weight of durene, the weight ratio of the manganese compound to the cobalt compound being 2 to 4 and the atomic ratio of the cobalt and manganese mixture to bromine being 1 to 10.

14. Process according to claim 7 wherein the heavy metal component of the catalyst is a mixture of cobalt acetate or carbonate and manganese acetate or carbonate mixed at the weight ratio of 1:2 to 1:4.

15. Process according to claim 8 wherein the bromine component of the catalyst is one or more substances selected from the group consisting of manganese bromide and potassium bromide.

16. Process according to claim 1 wherein the heavy metal and the bromine components of the catalyst are at the atomic ratio of 1:1 to 1:10.

17. Process according to claim 1 wherein the monocarboxylic acid having 2 to 8 carbon atoms per molecule is acetic acid.

18. Process according to claim 17 wherein 3 to 10 parts by weight of acetic acid is used per part by weight of raw material to be oxidized.

19. Process according to claim 1 wherein the a gas containing molecular oxygen is air.

20. Process according to claim 1 wherein the maximum temperature of the oxidation reaction is in the range of 180° to 240°C.

21. Process according to claim 1 wherein the first stage of oxidation is carried out in the temperature range of 110° to 160°C.

22. Process according to claim 1 wherein the oxidation reaction is carried out under a pressure of 10 to 50 atmospheres.

23. Process according to claim 1 wherein the strong acid is one or more acids selected from the group consisting of hydrochloric, nitric and sulfuric acids.

24. Process according to claim 23 wherein an aqueous acid solution containing 0.1 to 1.0 part by weight of acid per 100 parts by weight of the oxidation product is used.

* * * * *